(12) United States Patent
Kleine et al.

(10) Patent No.: US 6,659,205 B2
(45) Date of Patent: Dec. 9, 2003

(54) ROCK DRILL

(75) Inventors: Werner Kleine, Achim (DE); Hans-Werner Bongers-Ambrosius, Munich (DE); Udo Hauptmann, Landsberg/Lech (DE); Martin Richter, Freising (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/170,962

(22) Filed: Jun. 13, 2002

(65) Prior Publication Data
US 2002/0189865 A1 Dec. 19, 2002

(30) Foreign Application Priority Data
Jun. 15, 2001 (DE) .......................... 101 29 064

(51) Int. Cl.⁷ .............................. E21B 10/16
(52) U.S. Cl. ...................... 175/320; 175/415
(58) Field of Search ................ 175/320, 415, 175/417, 414, 420

(56) References Cited
U.S. PATENT DOCUMENTS 4,043,409 A    8/1977    Walter
4,474,488 A   10/1984    Pinkterton et al.
4,919,221 A    4/1990    Pascale
5,400,861 A    3/1995    Sheirer
2003/0102167 A1 * 6/2003  Pascale et al. .......... 175/415

FOREIGN PATENT DOCUMENTS

DE    3151167    7/1983
WO    0001919    1/2000

OTHER PUBLICATIONS

U.S. Patent Publication US/2002/0020566 A1.
Search Report.

* cited by examiner

Primary Examiner—William Neuder
(74) Attorney, Agent, or Firm—Sidley Austin Brown & Wood, LLP

(57) ABSTRACT

A rock drill including a drilling rod (2), a cup-shaped drilling head (5) secured to the drilling rod (2) at one of its ends, and connection elements including at least one radially projecting, entraining web (8) associated with the drilling rod (2) and received in at least one axially extending entrain slot (9) which is formed in an entrain surface of the cup-shaped drilling head (5) for securing the drilling head (5) to the drilling rod (2) for joint rotation therewith and for a limited axial displacement relative thereto.

16 Claims, 2 Drawing Sheets

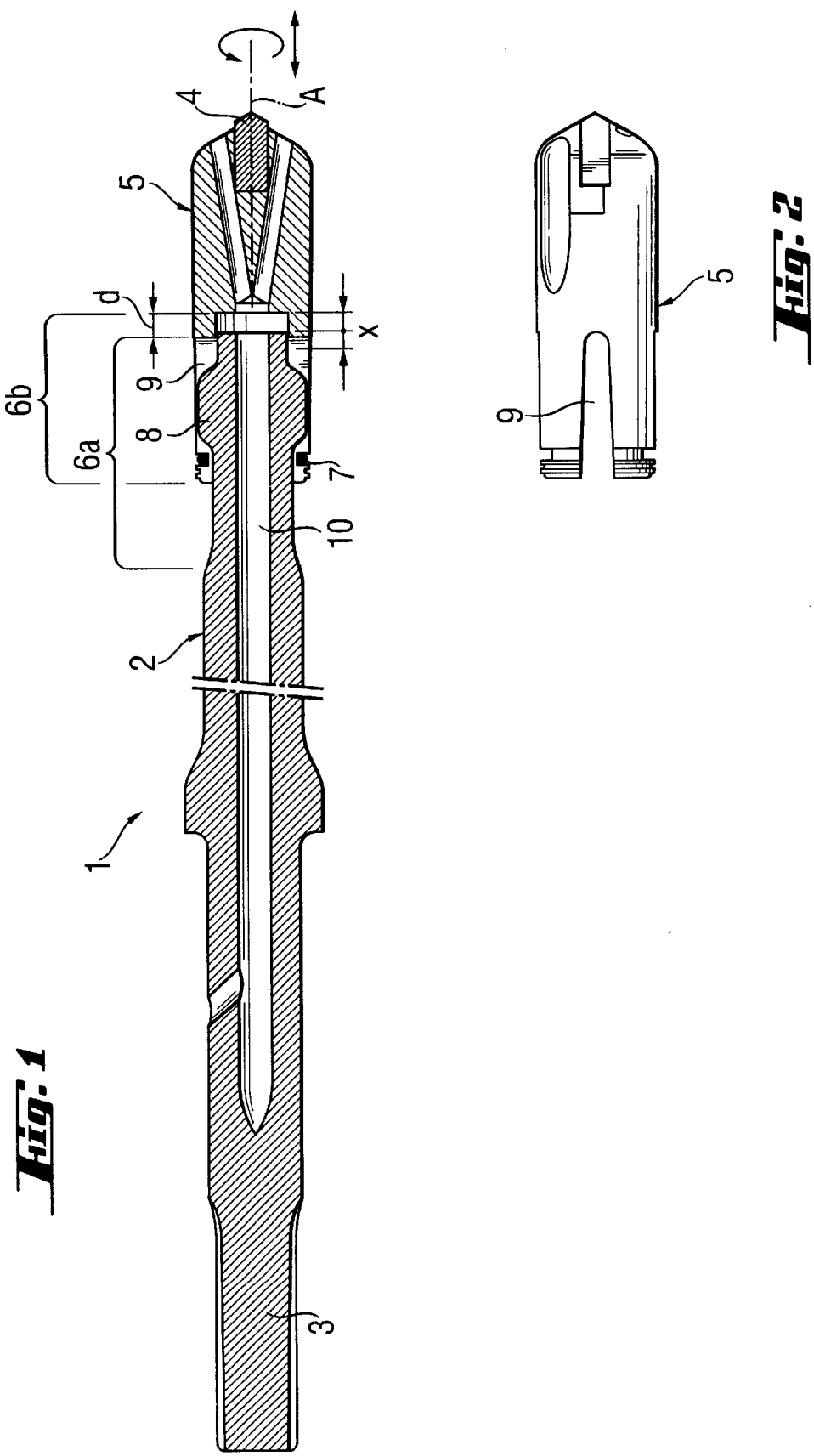

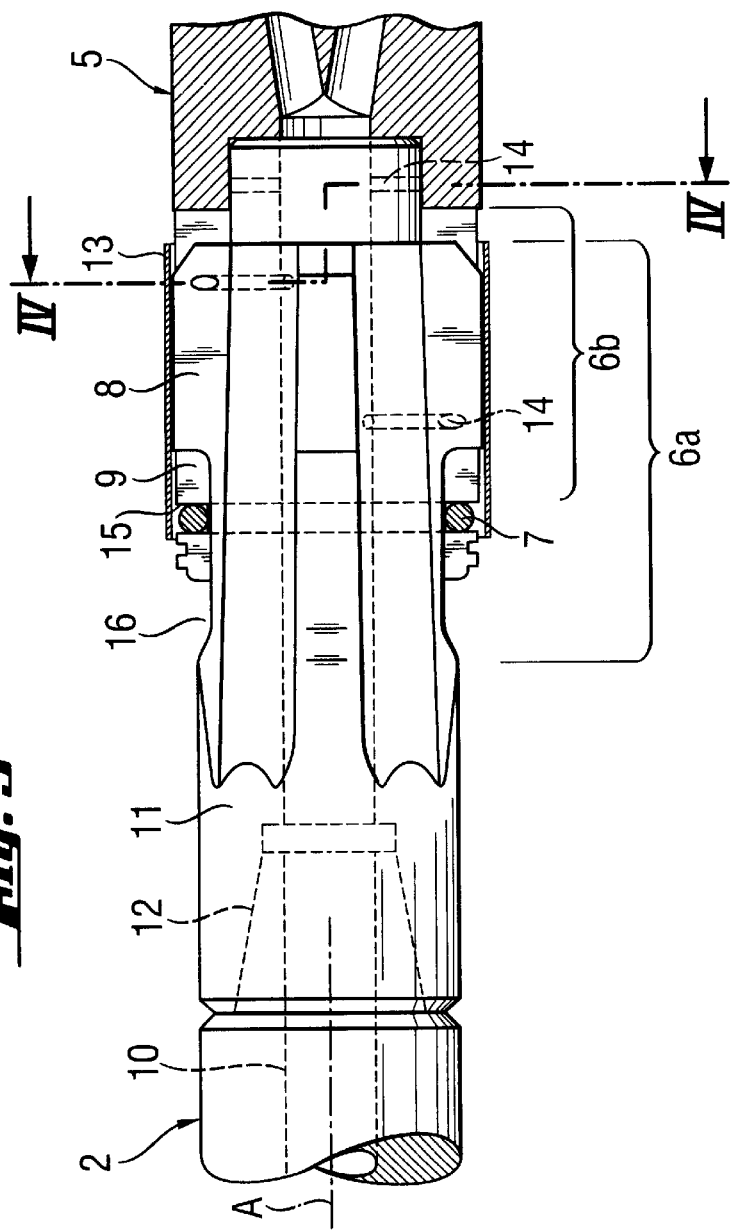

ROCK DRILL

BACKGROUND OF THE INVENTION

1. Field of the Invention

The present invention relates to a rock drill that is subjected to a rotary-percussion movement for removing material from stone or stone-like materials, in particular, in the mining industry.

2. Description of the Prior Art

Rock drills of the type described above include at least partially hollow drilling rod having a flush channel, a shank provided at the driving end of the drilling rod for securing the drill in a rotary-percussion power tool, connection means provided at the driven end of the drilling rod for connecting the drilling rod with the drilling head for joint rotation with the drilling head which has flush openings and is provided with bits formed of a hard material, and locking means for releasably connecting the drilling head with the drilling rod.

U.S. Pat. No. 6,021,855 discloses a rock drill in which in order to increase the drilling efficiency, the drilling head, which is provided with flush openings and bits formed of a hard material, is connected to the drilling rod with a possibility of a limited axial displacement relative thereto by an elongate swingable guide stem with entraining means arranged thereon.

German utility model GM930844 discloses a rock drill in which the drilling head, which has flush openings and bits formed of a hard material, is provided with entrain webs which engage in diametrical grooves formed in an end region of the drilling rod, in bayonet-like manner for connecting the drilling head with the drilling rod for joint rotation therewith.

German Patent No. 3,941,609 discloses a rock drill having an adapter releasably connectable with the driving rod by a cone and having its driven end releasably connected with the drilling head by appropriate locking means. The adapter includes connection means that cooperates with tapering guide pin means provided at the driving end of the drilling head, insuring joint rotation of the drilling rod and the drilling head. The drilling head has flush openings and bits formed of a hard material.

With the drilling head connected as described above, the impact pulses, which are transmitted via an outer annular contact region, lead to a radial widening of the end surface of the driven connection element(s), limiting their service life. In addition, large frictional forces are generated along the guide pin means during the limited axial movement of the drilling head. The frictional forces cause wear of the guide pin means and/or inhibit its movement.

U.S. Pat. No. 4,515,230 discloses a rock drill having a cup-shaped drilling head with flush openings and bits formed of a hard material and which is connected with a tapering, impact-transmitting, end side of the drilling rod by hexagonal means. There is further provided locking means for releasably connecting the drilling head with the drilling rod.

International Publication WO85/02442 discloses a rock drill having a cup-shaped drilling head with bits formed of a hard material and connected with the drilling rod for joint rotation therewith by inner hexagonal means. The flush openings are formed as diametrical slots. The drilling head is releasably connected with the drilling rod by locking means. It should be pointed out that the formation of the inner hexagon in the drilling head is rather expensive. In addition, during the limited axial displacement of the drilling head along the end side of the drilling rod, substantial frictional forces are generated, leading to the wear of the involved components.

U.S. Pat. No. 4,474,488 discloses a rock drill having a drilling rod with a tapering, impact pulse-transmitting end that engages in the cup-shaped drilling head. The drilling rod end has a plurality of radially projecting, dovetail-shaped entraining webs which formlockingly engage in associated dovetail-shaped inner grooves formed in the cup-shaped drilling head. The drilling head has flush openings and bits formed of a hard material. The formation of the dovetail-shaped webs and grooves is very expensive. In addition, during the limited axial movement of the drilling head along the entraining webs, substantial frictional forces are generated, leading to a substantial wear.

An object of the present invention is to provide a rock drill having a drilling head releasably connectable with the drilling rod and connected with drilling rod for joint rotation therewith and for a limited axial displacement relative thereto, which rock drill is characterized by an increased service life of the drilling rod and which can be economically manufactured.

SUMMARY OF THE INVENTION

This and other objects of the present invention, which will become apparent hereinafter, are achieved by providing a rock drill, including a drilling rod, a cup-shaped drilling head secured to the drilling rod at one of its ends, connection means for securing the drilling head to the drilling rod for joint rotation therewith and for a limited axial displacement relative thereto, with the connection means including at least one radially projecting, entraining web associated with the drilling rod and at least one axially extending entrain slot which is formed in an entrain surface of the cup-shaped drilling head and in which the at least one entraining web is received.

In the rock drill according to the present invention, the end surface of the drilling rod transmits impact pulses only to the bottom of the cup-shaped section of the drilling head. As a result, an impact pulse causes only a localized hydrostatic pressure without any noticeable change of the shape of the involved components, which increases the service life of both the drilling rod and the drilling head. At the same time, the rotational movement is transmitted to the entrain surface of the cup-shaped drilling head by the entraining web of the drilling rod impact-free. As a result, torsional flexural resistance of the drilling head prevents the plastic deformation of the drilling head, so that an apportioned flat entraining contact with the entraining web of the drilling rod is established. This further increases the service life of both the drilling head and the drilling rod. In rock drills, it is the drilling head that is subjected to a high load, and, therefore, requires a comparatively often replacement. With the rock drill according to the present invention, only the drilling head needs to be replaced upon wearing off. A further advantage of the rock drill according to the present invention consists in that the driven-side entrain slot can be easily formed by sawing or milling.

Advantageously, the connection means radially tapers, along the drill axis, toward the drilling head, forming with the drill axis a cone angle of from 0° to 5°, preferably, 3°. With angles discussed above, the radial surface pressure and, thereby the radial wear are substantially reduced at a limited axial displacement of the drilling head from 0.5 mm to 5 mm and with an adequate guidance of both connection elements.

Advantageously, the driving connection element is formed as an end of the drilling rod tapering radially in the direction toward the boring head, and the driven connection element is formed as an end sleeve radially conically widening toward the drilling rod, with cone angles of the tapering end and the conically widening sleeve being the same.

Advantageously, the at least one entrain slot of the drilling head conically expands or widens, with regard to its circumferential width, toward the drilling rod, forming a cone angle with the drill axis that amounts to from 0° to 5° and, preferably, is about 3°. With such conically expanded entrain slot, radial surface pressure, and, thereby, the radial wear are substantially reduced at a limited axial displacement of the drilling head from 0.5 mm to 5 mm and with an adequate rotational connection of the entraining web with the entrain slot. Advantageously, the entraining web tapers radially in the direction toward the boring head, forming the same cone angle as the conically expanding entrain slot.

Advantageously, the end of the at least one entrain slot of the drilling head facing toward the drill tip, is rounded, preferably, with a radius equal to a half of the slot width. This permits to obtain a smallest possible notch effect with regard to the entrain slot, which contributes to the increase of the service life of the drilling head.

Advantageously, the at least one entrain slot ends, in the direction toward the drill tip, in front of the cup bottom of the drilling head. As a result, the material weakness and, thereby, a possible starting point of a fissure would be located in the cup (sleeve) section of the drilling head, i.e., in the region of the planar stress condition, so that the danger of the fissure formation at a high dynamic load is rather small. Advantageously, the axial distance between the end of the entrain slot and bottom of the cup section somewhat corresponds to the wall thickness of the cup section. This insures that the region of the planar stress condition is adequately coined and that a large entrain surface is formed.

Advantageously, there are provided at least two entrain slots in the cup-shaped drilling head and which are advantageously arranged diametrically opposite each other. With two diametrically opposite entrain slots, the circumferential surface pressure of the entrain surfaces is noticeably reduced. In addition, both slots can be easily formed by sawing or milling. Two entraining webs, which are provided on the drilling rod cooperate with respective entrain slots. When four entraining slots are provided, they are arranged pairwise diametrically opposite each other and cooperate with respectively arranged entraining webs provided on the drilling rod.

Advantageously, there is provided an intermediate connection member which is releasably secured between the drilling rod and the drilling head. At least one entraining web is provided at the driven end of the intermediate connection member and cooperates with a respective entrain slot formed in the drilling head. There is further provided an intermediate connection element, e.g., a cone connection element that releasably connects the driving end of the intermediate connection member with the drilling rod. The use of the intermediate connection member permits to avoid replacement of the entire drilling rod in case of wear of the entraining web(s). When the intermediate connection member is used, only it needs to be replaced upon wear of the entraining webs.

Advantageously, the drilling rod, the drilling head, and the intermediate connection member, when used, have a flush channel for conducting of a flush liquid, e.g., water. The flush liquid is used for cooling the drilling head, for separating the movable connection parts, providing a fluid film therebetween which reduces wear, and for dispersing the removed material.

Advantageously, the drilling rod or the intermediate connection member and/or the drilling head have (has), in the region of the entraining webs and/or the region of the entrain slots, respectively, lubrication conduit means in form of slots and/or bores which communicate a portion of the flush fluid to the contact surfaces of the movable connection parts, distributing it there substantially uniformly.

Advantageously, with the use of locking means, there is provided a thin outer wear-protection sleeve which surrounds the axial region of the entraining webs and the entrain slots. The wear-protection sleeve provides for accumulation of the flushing fluid in the region of the contact surfaces of the movable connection parts and protects them from abrasive particles which are present in the removed material carried away by a reversed flow of the flushing fluid. The wear-protection sleeve is advantageously fixedly secured either on the radially projecting entraining webs or on the drilling head in the region of the entrain slots. The fixed mounting of the wear-protection sleeve prevents a movable contact between respective parts and, thereby, their wear. The wear-protection sleeve is formed of spring steel as an elastic sleeve with longitudinally extending helical slots. The wear-protection sleeve is elastically mounted over the drill tip.

Advantageously, the locking means is formed as an elastic open ring such as a self-locking circlip which is mounted in an at least partially circumferentially extending, radial slot formed in the drilling head. The circlip engages, with its inner surface, an axial recess formed in one of the entraining webs and having an axial extent corresponding to an allowable axial displacement of the drilling head. The circlip insures a simple locking of both connection components of a rock drill which is subjected to a rotary-percussion movement.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS:

In the Drawings:

FIG. 1 shows a cross-sectional view of a rock drill according to the present invention; and FIG. 2 shows a side view of the drilling head of the rock drill shown in FIG. 1;and FIG. 3 shows a partially cross-sectional axial view of a rock drill according to the present invention with an intermediate connection member; and FIG. 4 shows a cross-sectional views along line IV—IV in FIG. 3.

DETAILED DESCRIPTION OF THE PREFERRED EMBODIMENTS

A rock drill according to the present invention, which is shown in the drawings, in particular in FIGS. 1–2 and is designed for use with a rotary-percussion power tool, has a drilling pipe or rod 2 having a shank 3 receivable in a chuck of the power tool, and a drilling head 5. The drilling head 5 has a tip 4, which is formed of a hard material. The drilling head 5 is secured at the end of the drilling rod 2 opposite the shank 3 with a possibility of a limited axial displacement along the length X of about 5 mm. The connection means, which connects the drilling head 5 to the drilling rod 2 for joint rotation therewith and for limited axial displacement relative thereto, includes a driving connection section 6a of the drilling rod 3 and a driven connection section 6b of the cup-shaped drilling head 5. The driven connection section 6b of the drilling head 5 is releasably secured on the driving connection section 6a of the drilling rod 2 with a locking element 7.

At the end surface of the drilling rod 2 which transmits blow pulses to the cup bottom of the drilling head 5, there are provided four, radially projecting, entraining webs 8 which engage in four, axially extending, entrain slots 9 which are formed in the entrain surface of the cup-shaped drilling head 5. The entrain slots 9 are arranged pairwise diametrically opposite each other and end, in the direction toward the tip 4, at a distance d in front of the cup bottom of the drilling head 5. The distance d approximately corresponds to the wall thickness of the cup section of the drilling head 5.

Both the drilling rod 2 and the drilling head 5 have an axially extending flush channel 10. The axially extending entrain slots 9 conically widen in a direction toward the drilling rod 2, i.e., the circumferential width of the slots 9 increases in the direction toward the drilling rod 2, with the cone angle with respect to the drill axis A amounting to about 3°. At their ends facing in the direction toward the tip 4, the slots 9 are rounded with a radius equal to half of a slot width.

In the embodiment shown in FIG. 3, in intermediate connection member 11 is provided between the drilling head 5 and the drilling rod 2. At its driven, in the direction toward the drilling head 5, end, the intermediate connection member 11 has the driving connection section 6a with the entraining webs 8 and is releasably connected, at its opposite, driving end, to the drilling rod 11 by an intermediate connecting element 12. The intermediate connecting element 12 is formed as a cone connector having an entraining element provided at its end surface and connectable with the drilling rod 2. The conical sections 6a, 6b axially taper in a direction toward the drilling head 5, with the cone angle toward the axis A amounting to about 3°. In the locked position of the connection sections 6a, 6b, a thin wear-protection sleeve 13, which is formed of a spring steel, surrounds the axial region of the entraining webs 8 and entrain slots 9 and engages radially the radially projecting entraining webs 8. The intermediate connection member 11 has, in the region of the entraining webs 8, a plurality of axially extending lubrication bores 14 offset with respect to webs 8. The lubrication bores 14 extend transverse to the axis A and communicate with the flushing conduit 10. The locking element 7, which is formed as a springy circlip automatically locks in an outer circumferential annular slot 15 formed in the drilling head 5, radially engaging in an axial slot 16 in one of the entraining webs 8.

FIG. 4 shows a pairwise arrangement of the entraining webs 8 diametrically opposite each other, with the web pair extending perpendicular to each other.

Though the present invention was shown and described with references to the preferred embodiments, such are merely illustrative of the present invention and are not to be construed as a limitation thereof, and various modifications to the present invention will be apparent to those skilled in the art. It is, therefore, not intended that the present invention be limited to the disclosed embodiments or details thereof, and the present invention includes all of variations and/or alternative embodiments within the spirit and scope of the present invention as defined by the appended claims.

What is claimed is:

1. A rock drill, comprising a drilling rod (2); a cup-shaped drilling head (5) secured to the drilling rod (2) at one end thereof; connection means (6a, 6b) for securing the drilling head (5) to the drilling rod (2) for joint rotation therewith and for a limited axial displacement relative thereto, the connection means including at least one radially projecting, entraining web (8) associated with the one end of the drilling rod (2) and at least one axially extending entrain slot (9) which is formed in an entrain surface of the cup-shaped drilling head (5) and in which the at least one entraining web is received; and locking means (7) for releasably connecting the drilling head (5) with the drilling rod (2).

2. A rock drill according to claim 1, wherein the drilling rod (2) and the drilling head (5) have common channel means (10) at least partially extending along a drill axis (A) for conducting flushing fluid.

3. A rock drill according to claim 2, further comprising at least one lubrication slot (14) provided in at least one of the drilling rod (2), in a region of the at least one entraining web (8), and the drilling head (5), in a region of the at least one entrain slot (9).

4. A rock drill according to claim 1, wherein the connection means (6a, 6b) taper along a drill axis (A) in a direction toward the drilling head (5).

5. A rock drill according to claim 4, wherein a cone angle, which the tapering connection means (6a, 6b) form with the drill axis (A) amounts to from 0° to 5°.

6. A rock drill according to claim 1, wherein the at least one entrain slot (9) of the drilling head (5) conically expands, with regard to a circumferential width of the entrain slot (9), in a direction toward the drilling rod (2).

7. A rock drill according to claim 6, wherein a side surface of the connically expanding entrain slot (9) forms with a drill axis (h) a cone angle from 0° to about 5°.

8. A rock drill according to claim 1, wherein an end of the at least one entrain slot, which faces toward a drill tip (4) is rounded.

9. A rock drill according to claim 8, when a radius of the rounded end of the at least one entrain slot (9) is equal to about half of a slot radial width.

10. A rock drill according to claim 1, wherein the at least one entrain slot (9) ends, in a direction toward a drill tip (4), in front of a bottom of a cup section of the drilling head (5).

11. A rock drill according to claim 10, wherein an axial distance (d) between an end of the at least one entrain slot (9) and the bottom of the cup section of the drilling head (5) corresponds to about a wall thickness of the cup section of the drilling head (5).

12. A rock drill according to claim 1, wherein the connection means comprises a further radially projecting, entraining web (8) provided at the one end of the drilling rod (2) and a further axially extending entrain slot (9) which is formed in an entrain surface of the cup-shaped drilling head (5) and in which the further entraining web is received.

13. A rock drill according to claim 1, wherein the connection means comprises altogether four radially projecting, entraining web (8) provided at the one end of the drilling rod (2) and arranged pairwise diametrically opposite each other, and four axially extending entrain slot (9) which is formed in an entrain surface of the cup-shaped drilling head (5) and which are likewise are arranged pairwise diametrically opposite each other for receiving the four entraining webs.

14. A rock drill according to claim 1, further comprising an outer, thin wear-protection sleeve (13) surrounding an axial region of the at least one entraining web (8) and at least one entrain slot (9) in a locking position of the connection means (6a, 6b).

15. A rock drill according to claim 1, wherein the locking means (7) is formed as a springy circlip located in an outer, extending at least partially circumferentially, radial annular slot (15) formed in the drilling head, and engaging in an axial recess (16) formed in the at least one entraining web (8) and corresponding to a length (x) of an allowable axial displacement region of the drilling head.

16. A rock drill according to claim 1, further comprising an intermediate connection member (11) releasably secured between the drilling rod (2) and drilling head (5) and having the at least one radially projecting entraining web (8) provided at the driven end of the intermediate connection member and cooperating with the at least one extending entrain slot (9) which is formed in an entrain surface of the cup-shaped drilling head (5); and an intermediate connection element (12) for releasably connecting the intermediate connection member (11), at a driving end thereof, with the drilling rod (2).

* * * * *